(12) United States Patent
Turnbull et al.

(10) Patent No.: US 7,988,308 B2
(45) Date of Patent: Aug. 2, 2011

(54) INDIVIDUAL MIRROR CONTROL SYSTEM

(75) Inventors: Robert R. Turnbull, Holland, MI (US); Michael T. Dillane, Grand Rapids, MI (US); Robert C. Knapp, Coloma, MI (US); Darin D. Tuttle, Byron Center, MI (US)

(73) Assignee: Gentex Corporation, Zeeland, MI (US)

( * ) Notice: Subject to any disclaimer, the term of this patent is extended or adjusted under 35 U.S.C. 154(b) by 742 days.

(21) Appl. No.: 11/754,810

(22) Filed: May 29, 2007

(65) Prior Publication Data

US 2008/0037130 A1    Feb. 14, 2008

Related U.S. Application Data

(60) Continuation-in-part of application No. 10/939,842, filed on Sep. 13, 2004, now abandoned, which is a continuation-in-part of application No. 10/621,666, filed on Jul. 17, 2003, now Pat. No. 6,789,907, which is a continuation of application No. 10/137,603, filed on May 2, 2002, now Pat. No. 6,595,650, which is a continuation of application No. 09/878,022, filed on Jun. 8, 2001, now Pat. No. 6,386,713, which is a division of application No. 09/525,391, filed on Mar. 15, 2000, now Pat. No. 6,247,819, which is a continuation of application No. PCT/US97/16946, filed on Sep. 16, 1997.

(51) Int. Cl.
*B60R 1/08* (2006.01)
*G02F 1/15* (2006.01)

(52) U.S. Cl. ........................................ 359/604
(58) Field of Classification Search .......... 359/601–604, 359/608, 265–267
See application file for complete search history.

(56) References Cited

U.S. PATENT DOCUMENTS

| | | |
|---|---|---|
| 4,580,875 A | 4/1986 | Bechtel et al. |
| 4,896,030 A | 1/1990 | Miyaja |
| 4,917,477 A | 4/1990 | Bechtel et al. |
| 5,204,778 A | 4/1993 | Bechtel |
| 5,446,576 A | 8/1995 | Lynam et al. |
| 5,451,822 A | 9/1995 | Bechtel et al. |
| 5,469,296 A | 11/1995 | Ohno et al. |
| 5,486,952 A | 1/1996 | Nagao et al. |
| 5,537,003 A | 7/1996 | Bechtel et al. |
| 5,581,406 A | 12/1996 | Kobayashi et al. |
| 5,610,756 A | 3/1997 | Lynam et al. |
| 5,659,423 A | 8/1997 | Schierbeek et al. |
| 5,691,848 A | 11/1997 | VanLente et al. |
| 5,715,093 A | 2/1998 | Schierbeek et al. |

(Continued)

FOREIGN PATENT DOCUMENTS

IE    970014    7/1998

*Primary Examiner* — Mark Consilvio
(74) *Attorney, Agent, or Firm* — Price Heneveld LLP

(57) ABSTRACT

A control system for one or more electrochromic elements used in an outside electrochromic (OEC) mirror used in automobiles or other vehicular applications, to control the glare of both IEC elements used as a rearview mirror (20) as well as the OEC elements (24, 26) used as sideview mirrors (24, 26). An ambient light sensor (129) and glare sensor (133) operate to determine a glare level used to control both IEC and OEC electrochromic elements. The drive circuits for the OEC's elements may be controlled so as to account for various factors such as tinted glass characteristics in the vehicle.

26 Claims, 15 Drawing Sheets

U.S. PATENT DOCUMENTS

| | | |
|---|---|---|
| 5,812,321 A | 9/1998 | Schierbeek et al. |
| 5,956,012 A | 9/1999 | Turnbull et al. |
| 6,056,410 A | 5/2000 | Hoekstra et al. |
| 6,089,721 A | 7/2000 | Schierbeek |
| 6,210,008 B1 | 4/2001 | Hoekstra et al. |
| 6,247,819 B1 | 6/2001 | Turnbull et al. |
| 6,268,950 B1 | 7/2001 | Ash et al. |
| 6,299,315 B2 | 10/2001 | Hoekstra et al. |
| 6,302,545 B1 | 10/2001 | Aschofield et al. |
| 6,305,807 B1 | 10/2001 | Schierbeek |
| 6,355,920 B1 | 3/2002 | Schofield et al. |
| 6,386,713 B1 | 5/2002 | Turnbull et al. |
| 6,396,408 B2 | 5/2002 | Drummond et al. |
| 6,406,152 B1 | 6/2002 | Hoekstra et al. |
| 6,420,975 B1 | 7/2002 | DeLine et al. |
| 6,474,820 B1 | 11/2002 | Hoekstra et al. |
| 6,547,404 B2 | 4/2003 | Schierbeek |
| 6,595,649 B2 | 7/2003 | Hoekstra et al. |
| 6,639,519 B2 | 10/2003 | Drummond et al. |
| 6,679,608 B2 * | 1/2004 | Bechtel et al. ............ 359/604 |
| 6,700,692 B2 | 3/2004 | Tonar et al. |
| 6,789,907 B2 | 9/2004 | Turnbull et al. |
| 6,936,807 B1 | 8/2005 | Su et al. |
| 6,970,073 B2 | 11/2005 | Drummond et al. |
| 2003/0202249 A1 | 10/2003 | Schierbeek |
| 2004/0047043 A1 | 3/2004 | Hoekstra et al. |
| 2005/0094278 A1 | 5/2005 | Northman et al. |

\* cited by examiner

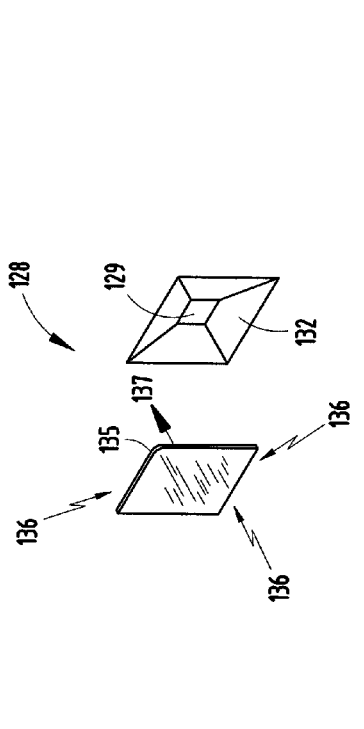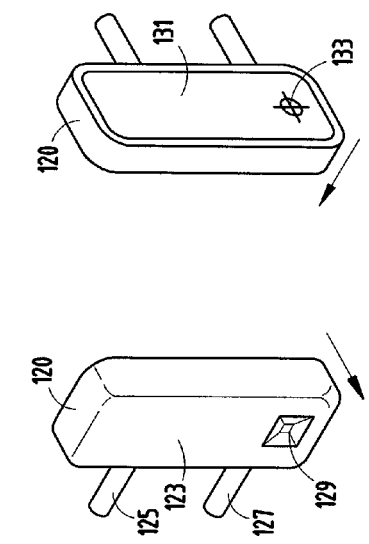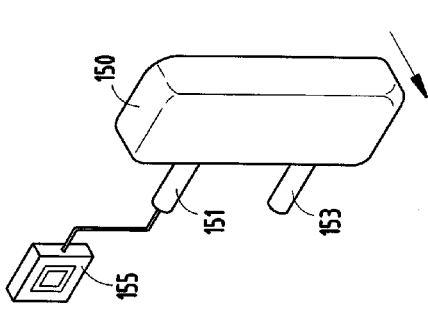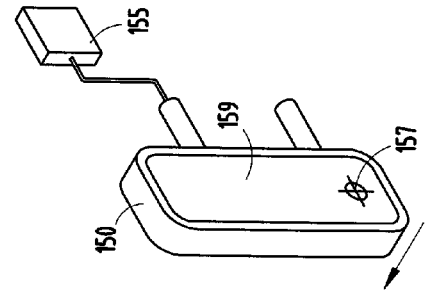

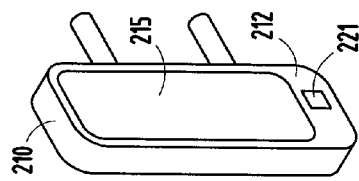
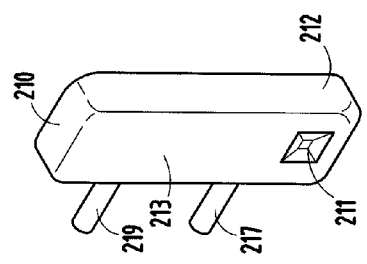
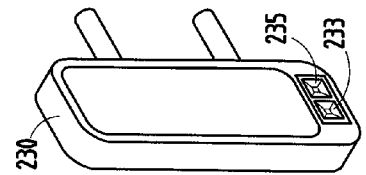
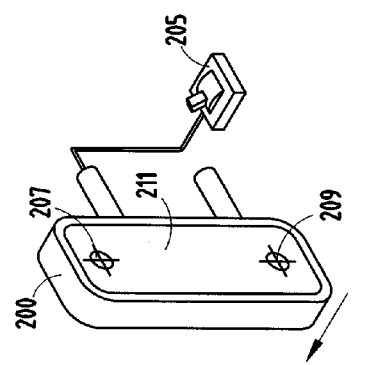
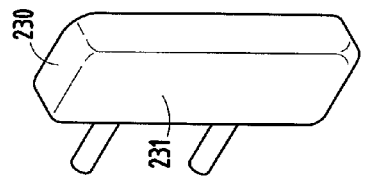
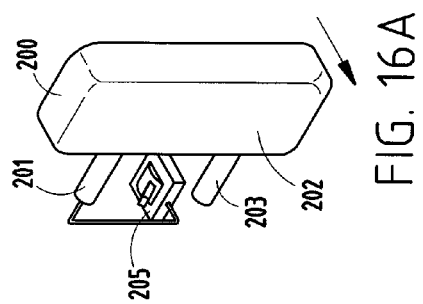

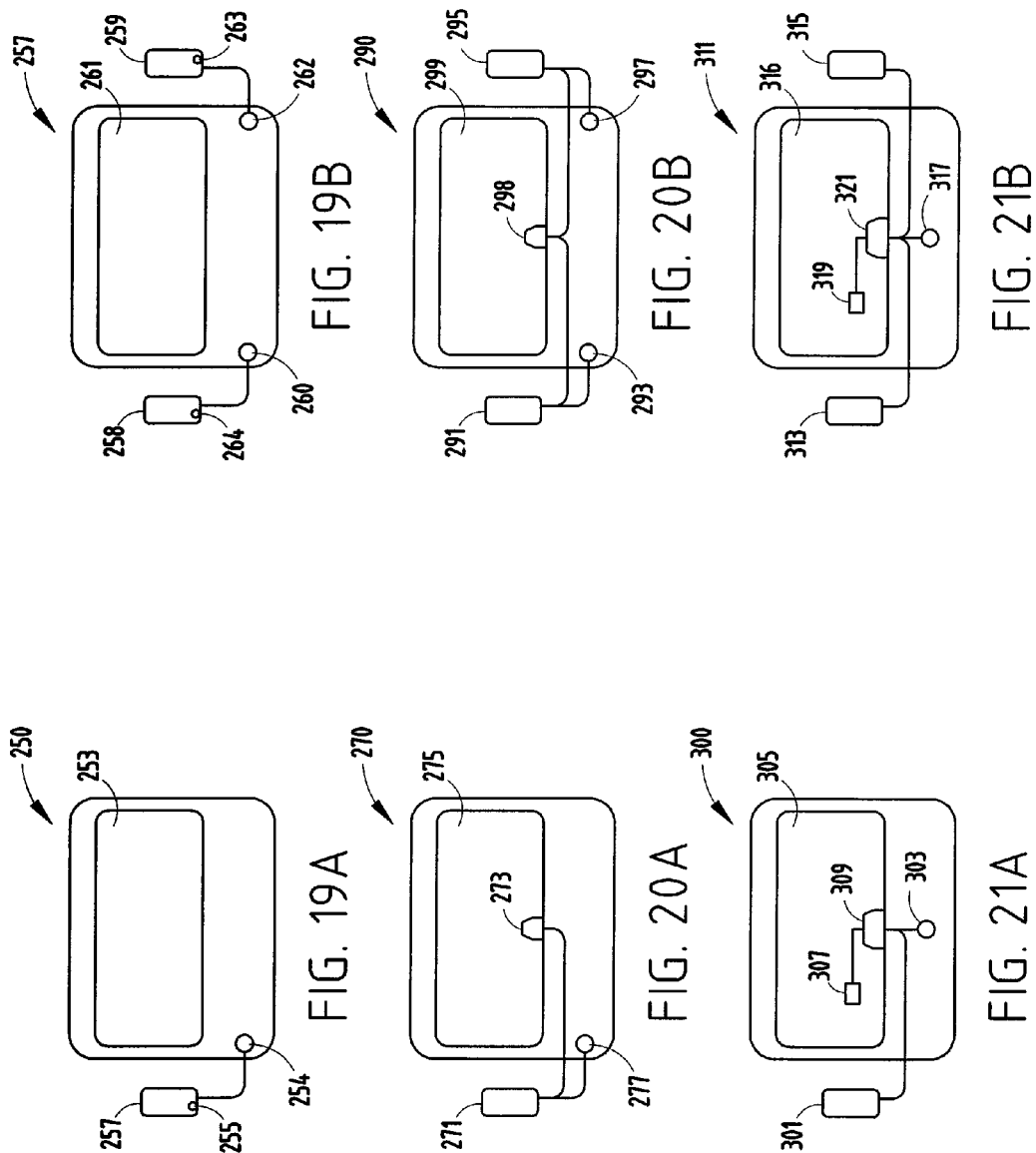

INDIVIDUAL MIRROR CONTROL SYSTEM

CROSS-REFERENCE TO RELATED APPLICATIONS

This application is a continuation-in-part of U.S. patent application Ser. No. 10/939,842 filed Sep. 13, 2004 now abandoned by Bradley L. Northman et al. which is a continuation-in-part of U.S. patent application Ser. No. 10/621,666 filed on Jul. 17, 2003 now U.S. Pat. No. 6,789,907, by Robert R. Turnbull et al. entitled "INDIVIDUAL MIRROR CONTROL SYSTEM," which is a continuation of U.S. patent application Ser. No. 10/137,603 filed on May 2, 2002, by Robert R. Turnbull et al. entitled "INDIVIDUAL MIRROR CONTROL SYSTEM," now U.S. Pat. No. 6,595,650, which is also a continuation of U.S. patent application Ser. No. 09/878,022 filed on Jun. 8, 2001, by Robert R. Turnbull et al. entitled "INDIVIDUAL MIRROR CONTROL SYSTEM," now U.S. Pat. No. 6,386,713, which is a divisional application of U.S. patent application Ser. No. 09/525,391, entitled "INDIVIDUAL MIRROR CONTROL SYSTEM," filed on Mar. 15, 2000, by Robert R. Turnbull et al., now U.S. Pat. No. 6,247,819, which is a continuation under 35 U.S.C. §120 of International PCT Application No. PCT/US97/16946, filed on Sep. 16, 1997, the disclosures of which are incorporated herein by reference.

BACKGROUND OF THE INVENTION

The present invention relates to a control system for electrochromic mirrors for use, for example, in automobiles and more particularly to a control system for an inside electrochromic (IEC) mirror and one or more outside electrochromic (OEC) mirrors, which are controlled by a glare signal generated within the vehicle.

Various electrochromic mirror and electrochromic window systems (hereinafter "electrochromic elements") are generally known in the art. Such systems normally include a plurality of electrochromic elements. For example, in automotive applications, electrochromic elements are known to be used for both the rearview mirror and one or more sideview mirrors as well as in window applications for sun load control. It is known that the reflectance of electrochromic elements used as mirrors (or transmittance in the case of electrochromic elements used for window applications) is a function of the voltage applied to the electrochromic element, for example, as generally described in commonly assigned U.S. Pat. No. 4,902,108, which is hereby incorporated by reference. Because of this characteristic, such electrochromic elements are known to be used in systems which automatically control glare from external light sources in various automotive and other applications. In automotive applications, the 12-volt vehicle battery is used as the electrical power source for the electrochromic elements. The electrochromic elements generally operate at a nominal voltage of about 1.2 volts. Since the actual electrochromic element voltages are relatively low compared to the supply voltage, it is known to use a single drive circuit for multiple electrochromic elements. In such applications, the electrochromic elements for the inside and outside mirrors are known to be connected either in series, parallel, or series parallel and driven from a single drive circuit.

In order to prevent damage to the electrochromic elements as well as control their reflectance, the voltage across each electrochromic element must be rather precisely controlled. However, it is known that the resistance of the electrochromic elements may vary as a function of temperature. Thus, in applications with the electrochromic elements being used both inside and outside the vehicle, the temperature difference between the inside and outside electrochromic elements can be relatively significant which can make relatively precise control of the electrochromic elements difficult.

There are other factors which make relatively precise control of the electrochromic elements difficult. For example, in known systems, a glare signal, typically generated within the vehicle, is transmitted by hardwiring to the OEC elements used for the sideview mirrors. The glare signal is used to control the reflectance of the electrochromic elements used for the sideview mirrors. As mentioned above, the OEC elements are normally connected in either series, series parallel, or in parallel with the IEC element used for the rearview mirror assemblies often requiring the voltage to the OEC elements to be scaled or offset. It is known that electrochromic elements typically require a low voltage drive, typically 1.2-1.4 volts to achieve minimum reflectance. As such, a drive voltage accuracy of 0.1 volts or better is required to maintain adequate glare control. Unfortunately, the ground system in an automotive environment can have differences in ground potential exceeding 2.0 volts under some conditions, which can drastically affect the operation of the electrochromic elements. In order to resolve this problem in known automotive applications OEC elements, relatively heavy gauge conductors are typically routed to each of the OEC elements transmission of the glare signal, which increase the cost and weight of installing such a system in an automobile.

There are other problems associated with the relatively accurate control of OEC elements. In particular, OEC elements can be classified according to three major types: flat, convex, and aspheric. The effective magnification or reflectance levels differ for each of the different curvature types. For example, flat mirrors are known to have the highest effective reflectance or magnification (i.e., 1 to 1) while the aspheric and convex mirrors provide relatively lower reflectance (i.e., 1 to 3 and 1 to 4, respectively) depending upon the degree of curvature. The different reflectance or magnification levels of the different OEC element types typically require different drive voltages, thus adding to the complexity of relatively accurate control of the OEC elements. Moreover, OEC elements come in a relatively large array of shapes and sizes which may require different drive voltages to compensate for voltage drops in the various coatings, solution, chemicals, and chemistry, for example, on the larger mirrors.

In order to provide the driver with acceptable glare levels from the IEC mirrors as well as the OEC mirrors, for example, during night driving, the drive voltages to each of the mirrors must be appropriately scaled. Since the IEC and the OEC elements do not share a common thermal environment, it has been relatively difficult if not impossible to correct for temperature-related performance changes in the OEC elements from the inside.

SUMMARY OF THE INVENTION

The present invention relates to a control system for a plurality of electrochromic mirrors, for example, used in automobiles, to control the glare level of the IEC elements used as rearview mirrors as well as the OEC elements used as sideview mirrors. The IEC element and each of the OEC elements are provided with an individual drive circuit. The drive circuits for the OEC elements may be customized to account for various factors, such as the type of curvature as well as the size and shape. Since individual drive circuitry is provided for the IEC element and each of the OEC elements, the reflectance of each of the elements can be relatively accurately controlled by way of glare signal generated inside the automobile. More particularly, the individual drive circuits for each of the outside mirrors can be used to scale the drive voltage for each electrochromic element to compensate for differences in the curvature or size as well as temperature of operation of the OEC elements. By providing individual drive circuits for each of the OEC elements, the need for two relatively heavy gauge conductors in order to limit the voltage drop and a ground referenced to the inside mirror and associated drive circuitry is eliminated, thus simplifying the manufacturing process. In particular, in the present invention, the ground voltage does not need to be referenced to the IEC element, thus only one conductor and chassis ground is sufficient. In one embodiment of the invention, the control system is adapted to control all the electrochromic elements to provide a relatively constant level of glare at a predetermined reference point, such as the driver's eye level, from all of the electrochromic elements.

BRIEF DESCRIPTION OF THE DRAWINGS

These and other objects of the present invention will be readily understood with reference to the specification and the following drawings, wherein:

FIGS. 11A and 11B illustrate an outside electrochromic mirror where an ambient light sensor is positioned faces forward of the mirror and a glare sensor is positioned to receiver light to the rear of the mirror in accordance with an embodiment of the present invention.

FIG. 11C illustrates a front prospective view of an ambient light sensor assembly like that used in FIG. 11A and 11B.

FIGS. 12A and 12B illustrate an outside electrochromic mirror where both the ambient light sensor and glare sensor face to the rear of the mirror in accordance with an embodiment of the invention.

FIGS. 13A and 13B illustrate an outside electrochromic mirror where an ambient light sensor is remotely positioned from the mirror and a glare sensor is positioned to receive light to the rear of the mirror in accordance with an embodiment of the present invention.

FIGS. 16A and 16B illustrate an outside electrochromic mirror where both the ambient light sensor and glare sensor face to the rear of the mirror and a remotely operated switch is used to activate the ambient light sensor in accordance with an alternative embodiment of the invention.

FIGS. 17A and 17B illustrate an outside electrochromic mirror where an ambient light sensor is positioned faces forward of the mirror and a glare sensor is positioned to receiver light to the rear of the mirror where both the ambient light sensor and glare sensor are not integrated with the mirror glass in accordance with an embodiment of the present invention.

FIGS. 18A and 18B illustrate an outside electrochromic mirror where both the ALS and glare sensor face to the rear of the mirror and are both not integrated with the mirror glass in accordance with an alternative embodiment of the invention.

FIGS. 19A and 19B are illustrations showing configurations of a single and dual mirror system where the ambient sensor and glare sensor are both in the outside mirror.

FIGS. 20A and 20B are illustrations showing configurations of a single and dual mirror system where the ambient sensor is in the vehicle cab and the glare sensor and operational circuitry are located in the outside mirror.

FIGS. 21A and 21B are illustrations showing configurations of a single and dual mirror system where the ambient sensor and operational circuitry are located in the vehicle cab and the glare sensor is located in the outside mirror.

DETAILED DESCRIPTION OF THE PREFERRED EMBODIMENT

Figure 1:
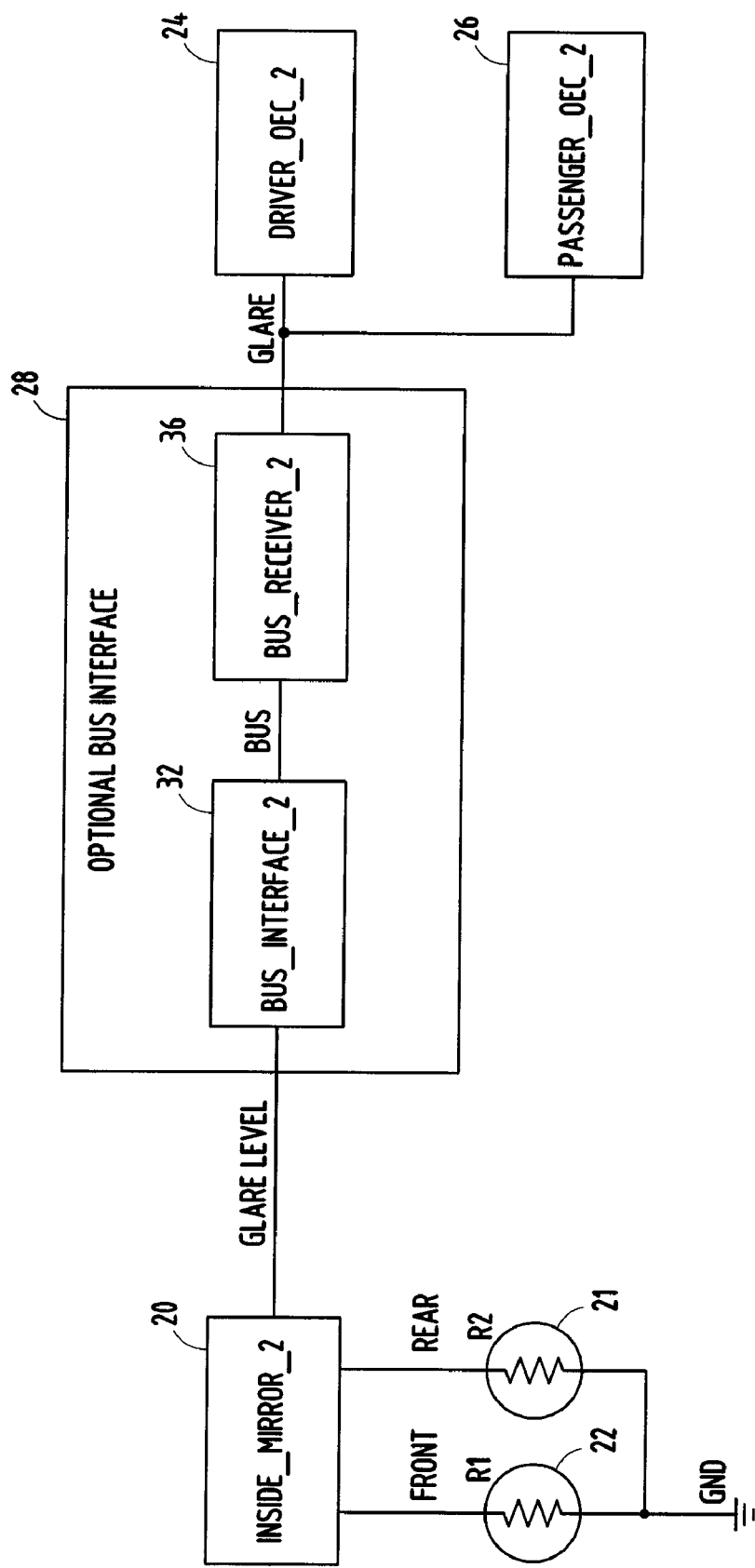
FIG. 1 is a block diagram of the system in accordance with the present invention.

The present invention relates to a control system for electrochromic elements that is particularly useful in automotive applications where an IEC element 20 is used as a rearview mirror and one or more OEC elements 24, 26 are used for the driver and passenger sideview mirrors. An important aspect of the invention relates to the fact that the IEC element 20 and one or more OEC elements 24, 26 are individually controlled. More particularly, in order to solve the various problems discussed above, individual drive circuits are provided for each of the mirrors containing electrochromic elements as opposed to driving the OEC elements, in series, parallel, or series parallel with the IEC element, as is known in the art. The drive circuits for each of the mirrors may be incorporated into the individual mirror assemblies (not shown) to enable the mirrors to be controlled by a glare signal, for example, a pulse width modulated (PWM) signal or digital signal, from inside the automobile.

The glare signal may be developed by a rearward-facing sensor 21 (FIG. 1), such as a photocell, and a forward-facing sensor 22, which may also be a photocell, to provide a glare signal relative to the ambient light level in order to control the reflectance of the electrochromic elements for the IEC 20 and OEC 24, 26 elements. These sensors 21 and 22 are known to be integrated in the inside mirror assembly.

The glare signal is used for driving OEC elements 24 and 26. Since each of the OEC elements 24, 26 is provided with an individual drive circuit, the glare signal may be coupled either directly with the OEC elements 24, 26 or by way of a bus interface, generally identified by the reference numerals 28 (FIG. 1) and 30 (FIG. 2). By providing an individual drive circuit for each of the electrochromic elements 20, 24, 26, the system in accordance with the present invention is adapted to compensate for differences in the thermal environment between the IEC 20 and the OEC 24, 26 elements as well as for differences in the curvatures as well as size of the OEC elements 24, 26. In particular, the glare signal can be scaled to compensate for differences in the curvature, size, and the various coatings used for the OEC 24, 26 elements as well as differences in the thermal environment relative to the IEC element 20. As such, a relatively accurately scaled element voltage may be generated for each electrochromic element that takes into account the size as well as the curvature and even the temperature environment of the OEC elements 24, 26 used for sideview mirrors. This allows automobile manufacturers to stock fewer inside mirror types, each capable of being used with a variety of different types of outside mirrors. Since the outside mirrors are nearly always unique to a particular model of an automobile, the customization of the outside element drive voltages for optimal glare control may be accomplished without an inventory and complexity penalty to the automobile manufacturer. Moreover, since the glare level is transmitted digitally or via a PWM signal, any ground voltage difference will not affect the glare signal at the OEC elements 24, 26, thus allowing the glare signal to be transmitted to the OEC elements 24, 26 using a relatively light gauge wire using a common chassis ground to save cost and weight.

Figure 2:
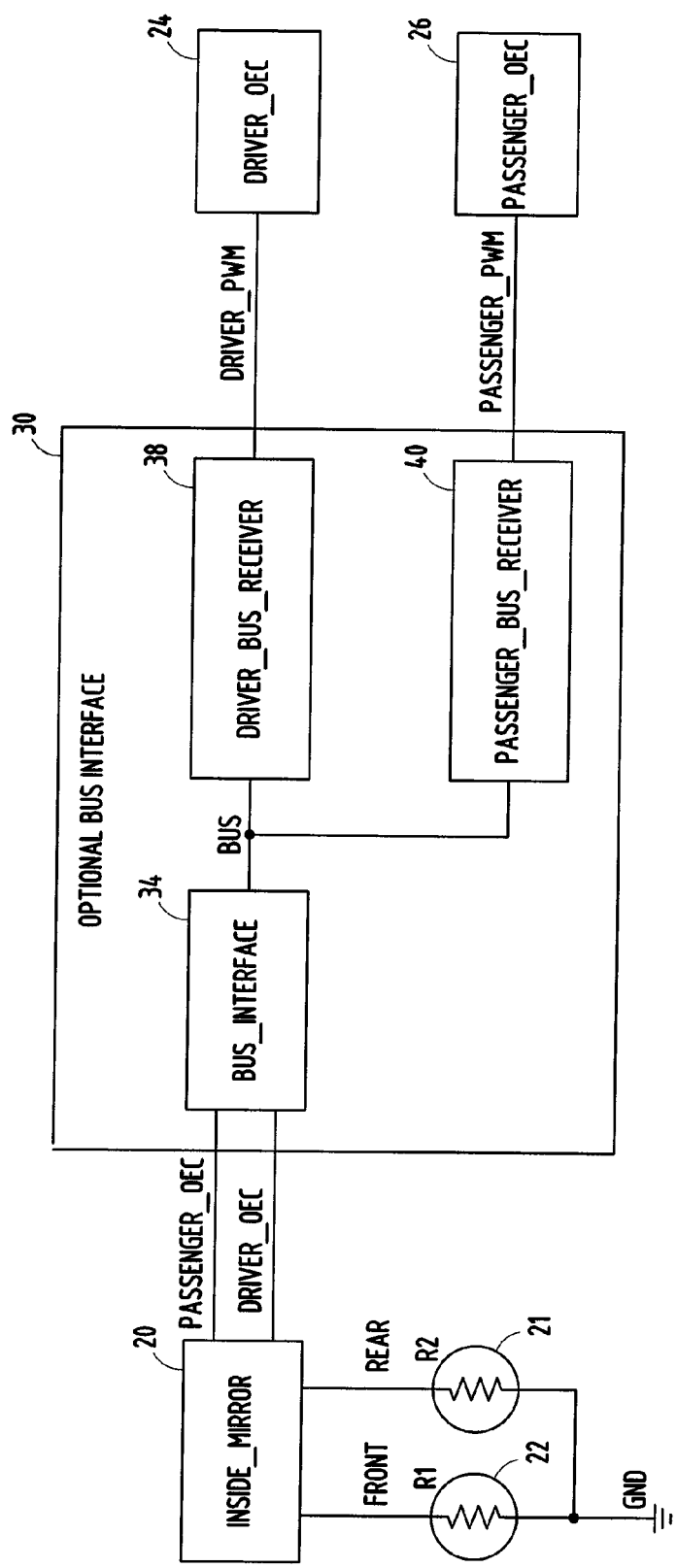
FIG. 2 is an alternate embodiment of the block diagram illustrated in FIG. 1.

FIGS. 1 and 2 show two exemplary embodiments of the invention. In both embodiments, one or more glare signals is transmitted to the outside OEC elements 24, 26, which contain integral drive circuits which can be scaled to provide relatively accurate control of the OEC elements 24, 26 as discussed above. Both embodiments illustrate the use of an optional bus interface, generally identified with the reference numerals 28 and 30. The optional bus interfaces 28 and 30 are merely exemplary and are not required for the practice of the invention. Such bus interfaces 28, 30 normally include a bus interface 32, 34, for example, a Motorola type 68HC705X4 and one or more bus receivers 36, 38, and 40, for example, a Unitrode, model No. UC 5350 bus receiver. In the embodiment illustrated in FIG. 1, the OEC elements 24 and 26 are driven from a common glare signal. Alternatively, in FIG. 2, separate glare signals may be generated for the passenger and driver side OEC elements 24, 26. The separate glare signals may be used to provide additional compensation in applications where convex mirrors are used on the passenger side of the vehicle, which are known to have relatively poor reflectance levels. In such applications, passenger_OEC and driver_OEC glare signals are developed from the rearward and frontward facing sensors 21 and 22. The passenger glare signal passenger_OEC may be scaled to compensate for relatively poor reflectance of the convex mirror. Both signals are applied to the bus interface 34 and, in turn, to a driver bus receiver 38 and passenger bus receiver 40. The driver bus receiver 38 generates a driver_PWM signal used for driving the driver's side OEC 24. Similarly, the passenger_bus_receiver 40 generates a passenger_PWM signal for driving passenger_OEC 26.

Figure 3:
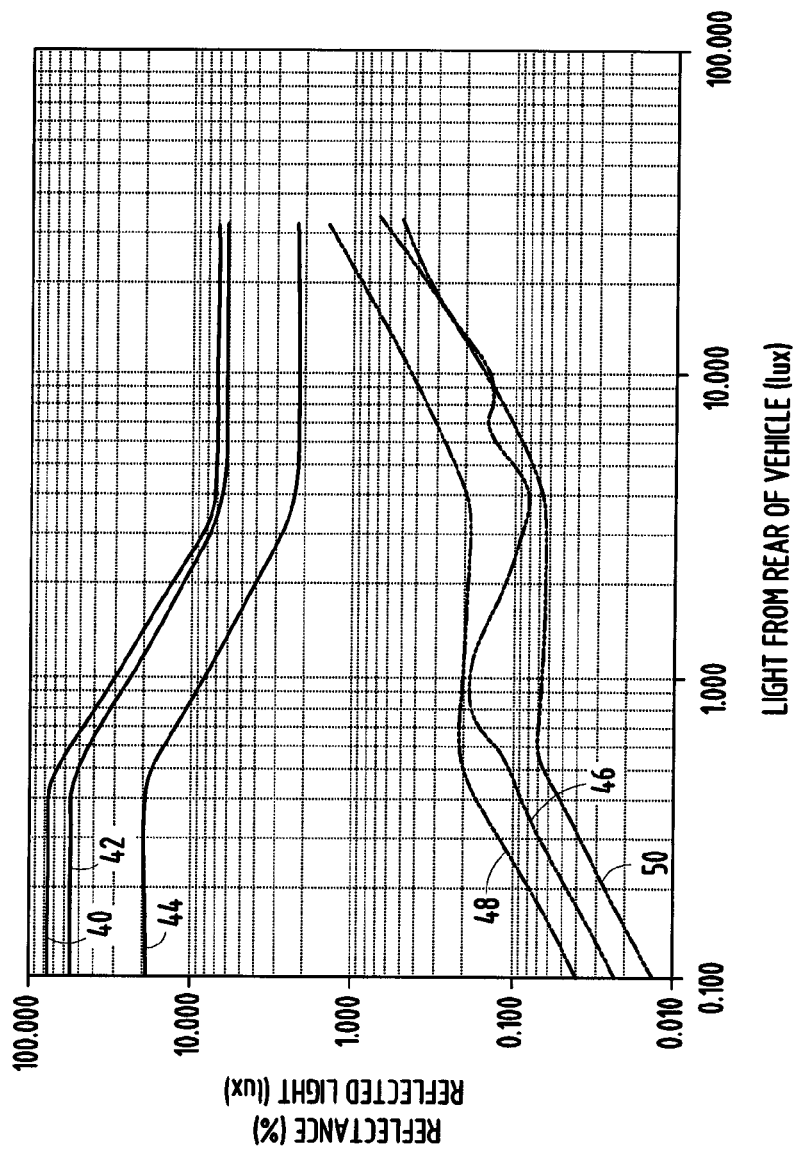
FIG. 3 is a graphical illustration of exemplary reflectance curves illustrating the reflectance of exemplary inside and OEC elements as a function of the light from the rear of the vehicle and also illustrates the reflectance of the electrochromic elements as a function of the reflected light at the driver's eye level.
Figure 4:
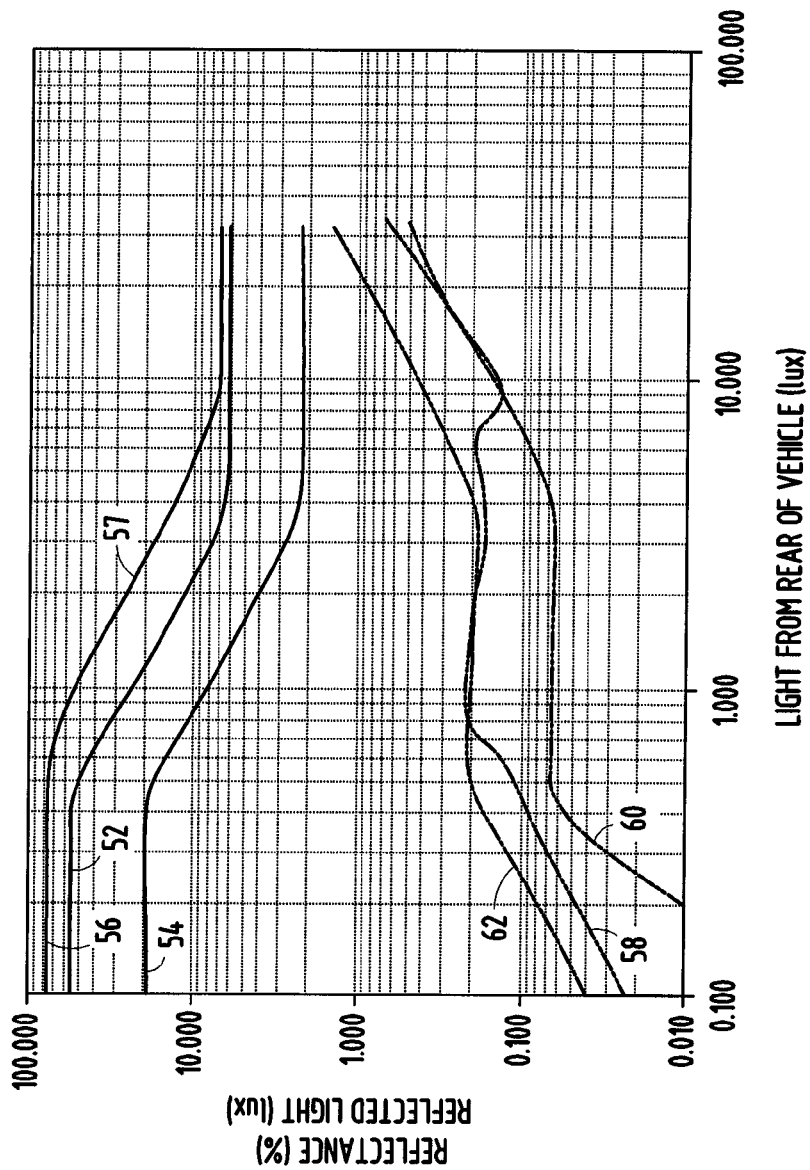
FIG. 4 is similar to FIG. 3, but illustrates compensation of the reflected light using slope adjustment in accordance with one embodiment of the invention.
Figure 5:
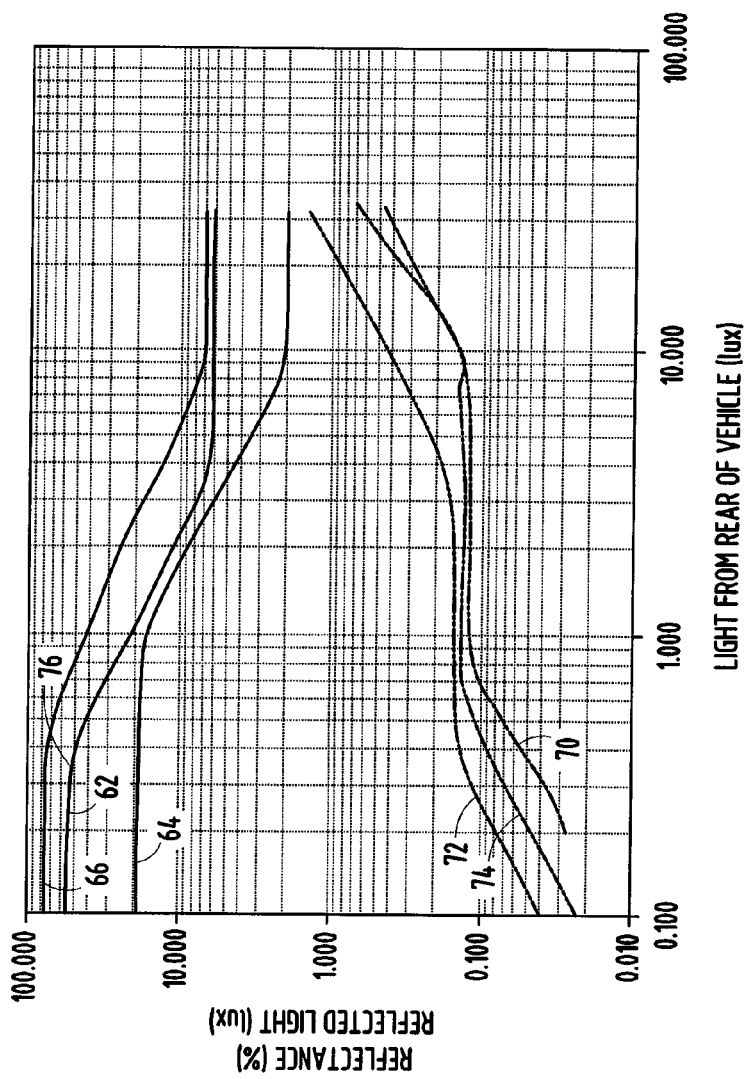
FIG. 5 is similar to FIG. 4 illustrating the difference in reflected light utilizing offset adjustment in accordance with an alternative embodiment of the invention.

The individual drive circuits also enable compensation for environmental factors, such as rear and side window tinting ("privacy glass") and/or front windshield masking. In such applications, due to the environmental factors, the light levels experienced at the respective mirror surfaces may be different at the driver eye level. The curves illustrated in FIGS. 3-5 represent an exemplary application where the transmittance of the rear window is about 30 percent while the transmittance of the side windows is about 70 percent. Exemplary mirrors are used for FIGS. 3-5. The reflectance of the IEC is selected with a maximum reflectance of about 75 percent while the maximum reflectance of the driver's side flat outside mirror is selected to be about 55 percent. The passenger side convex outside mirror is used with a perceived maximum reflectance value of about 18 percent. In particular, for flat mirrors, the measured reflectance levels are the same as the perceived reflectance levels. However, convex mirrors result in a lower perceived reflectance level due to the light diverging from the surface of the mirror. This difference is related to the radius of curvature of the mirror surface as well as the distance of an object from the mirror. As will be discussed in more detail below, the system in accordance with the present invention is able to compensate for these environmental factors in order to force the reflected light from the IEC element 20 as well as the OEC elements 24, 26 to be relatively constant at a predetermined reference point, such as the driver's eye level.

FIG. 3 is an exemplary graphical illustration illustrating the effects of the privacy glass on the reflected light at a predetermined reference point, such as the driver's eye level. The curve 40 represents the reflectance of an IEC element as a function of the light from the rear of the vehicle. The curves 42 and 44 illustrate the reflectance of a flat OEC element and a convex OEC element, respectively, as a function of the light from the rear of the vehicle. As illustrated, all three electrochromic elements are at a maximum reflectance level at relatively low light levels. As the light from the rear of the vehicle increases, the reflectance level of the various electrochromic elements decreases to a minimum reflectance value as shown. The light at the driver's eye level from each of the electrochromic elements is shown by way of the curves 46, 48, and 50. As shown in FIG. 3, the reflectance level of all three electrochromic elements start to decrease with relatively equal light from the rear of the vehicle. All three electrochromic elements also achieved a minimum reflectance at similar light levels. However, as shown by the curves 46, 48, and 50, the reflected light to the driver differs significantly for each electrochromic element. This is shown in FIG. 3 by the different reflectance levels for the three electrochromic elements in the region, for example, between 0.500 lux and 5.000 lux along the curves 46, 48, and 50, which is based upon the forward sensor being exposed to about 1.0 lux. Optimum performance is for the light levels at the driver's eye level to be fairly constant and equal in the range from about 0.500 lux to about 5.000 lux, which represents the active region of the exemplary IEC element 20 and exemplary OEC elements 24 and 26.

In at least one embodiment, an associated vehicle is provided with rear and side window tinting ("privacy glass") and/or front windshield masking information electronically encoded. For example, the electronically encoded information may be stored in a memory location, such as, a vehicle body controller module or data acquisition means. In any event, a host of known data acquisition and, or, storage means are known within vehicle systems. The electronically encoded information is then made available to a rearview mirror assembly that is configured to generate at least one mirror element drive signal as a function of the electronically encoded information. It should be understood that the vehicle may send the electronically encoded information to the mirror control circuit, the mirror control circuit may read the electronically encoded information from the vehicle or a combination thereof, such as, having the mirror control circuit request the information and the vehicle then send it. The mirror control circuit may then be configured to verify correct receipt of the information. In at least one embodiment, the electronically encoded information is made available as an input to a vehicle system; storage of the electronically encoded information is optional. It should be understood that each of the OEC drive circuits as well as an IEC drive circuit may individual receive/read the electronically encoded information. It should be understood that other electronically encoded information, such as, temperature, speed, steering, direction, pitch, yaw, ambient lighting, etc. may be configured similarly as the window tinting information and used for vehicle equipment control, such as the mirror reflectivity, exterior light control, moisture sensing, windshield wiper control, telemetry, defogger control, defroster control, etc.

FIGS. 4 and 5 relate to different methods in accordance with the present invention for compensating for differences in reflected light at a predetermined reference point, such as the driver's eye level due to, for example, the privacy glass. Referring to FIG. 4, the curves 52 and 54 for the OEC elements 24, 26 are similar to the curves 42 and 44 illustrated in FIG. 3. However, in this embodiment, a characteristic of the reflectance curve for the mirror curve 56 is modified. In particular, the slope 57 in the active region of the reflectance curve for the IEC 20 is decreased. By decreasing the slope, the reflected light to the driver's eye level from both the IEC 20 and driver's side flat OEC elements 24, as represented by the curves 58 and 62, are much closer in the active region of the electrochromic elements than in FIG. 3, for example, in the region between 0.500 lux and about 5.000 lux. However, the slope adjustment does not affect the light at the driver's eye level from the passenger side convex OEC element 26, which, as illustrated in FIG. 4, does not provide light at the driver's eye level close to the driver's side OEC and IEC elements.

FIG. 5 illustrates an embodiment in which the reflected light at a predetermined reference point, such as the driver's eye level, is relatively constant for the IEC 20 as well as for both of the exemplary OEC elements 24, 26. Referring to FIG. 5, the reflectance of the IEC 20 as well as the outside convex OEC 26 is represented by the curves 64 and 66, respectively, which are similar to the curves 40 and 44, respectively. In this embodiment, a characteristic of the reflectance curve for one of the OEC elements is altered. In particular, the offset of the driver's side flat OEC 24 reflectance is varied. In this embodiment, the point generally designated with the reference numeral 76, at which the flat outside mirror starts to decrease in reflectance, is offset as shown. By offsetting the point at which the mirror starts to decrease in reflectance, the reflected light levels from all three electrochromic elements at the driver's eye level will be approximately the same.

As should be clear in FIGS. 3-5, the privacy glass compensation results in relatively constant light levels for the IEC element 20 as well as the OEC elements 24, 26 at a predetermined reference point, such as the driver's eye level. Although specific examples for compensation for reflected light levels at the driver's eye level for exemplary IEC and OEC elements are discussed herein, the principles of the invention are not so limited. In particular, the principles of the present invention may be used to control virtually any combination of electrochromic elements in applications with and without privacy glass and virtually any reference point in automobile and non-automobile applications.

Figure 6:
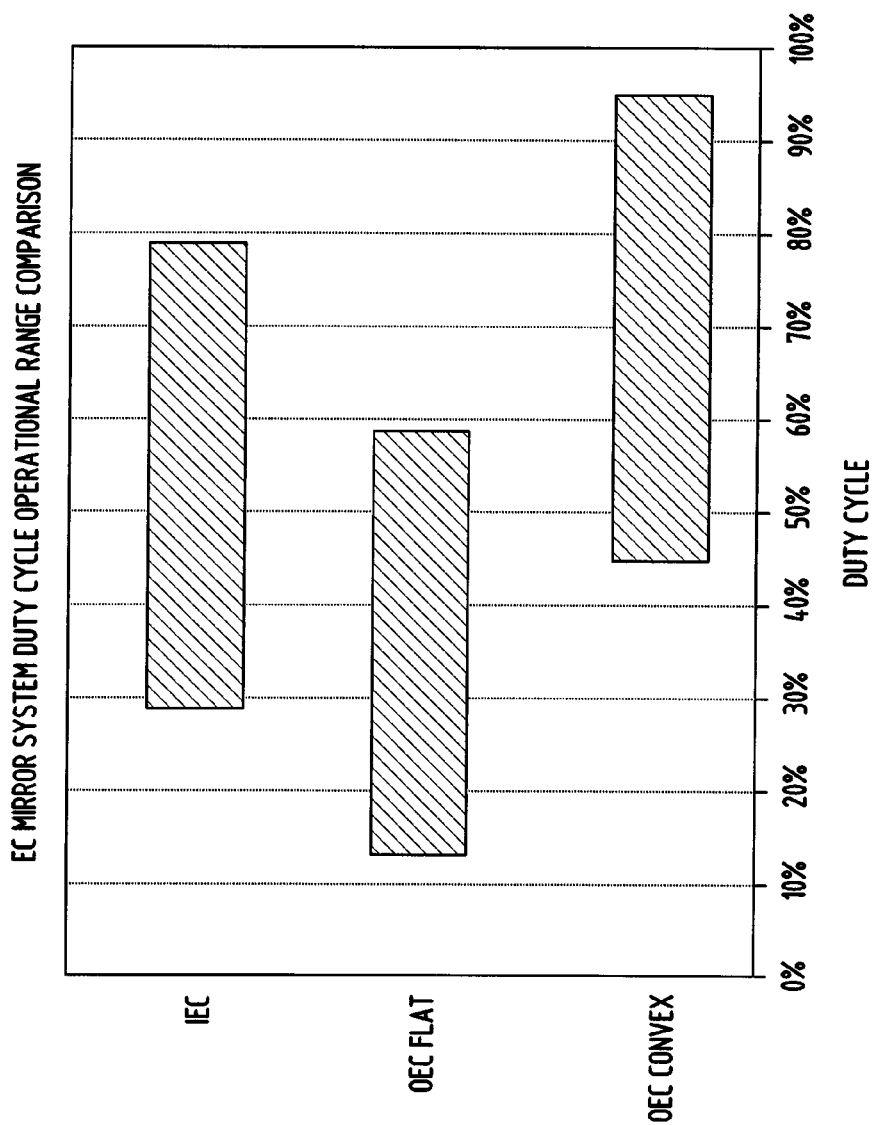
FIG. 6 is an exemplary graphical illustration showing the duty cycle for different types of OEC elements relative to an exemplary IEC element.

As mentioned above, the electrochromic elements are controlled, for example, by a PWM signal. The reflectance level of the particular electrochromic element, aside from the slope and offset adjustment discussed above, is varied by varying the duty cycle of the PWM signal. Exemplary duty cycles for an IEC element 20, flat OEC element 24 and a convex OEC element 26 are illustrated in FIG. 6. As shown, the IEC element 20 responds (dims) when the duty cycle reaches about 30 percent of its control range and may be fully dimmed when the duty cycle reaches approximately 80 percent. A flat OEC element 24, due to its lower reflectance level and the transmission rate of the driver's side window, needs to respond (dim) when the duty cycle reaches 15 percent and be fully dimmed when the duty cycle reaches about 60 percent. However, a convex OEC element 26, due to its perceived reflectance level, may not need to respond (dim) until the duty cycle reaches 45 percent and may be fully dimmed when the duty cycle reaches 95 percent. By designing the electrochromic elements, such that their operational response to the duty cycle, is based on the location of the electrochromic elements on the vehicle and the path that the light takes to reach the electrochromic elements, the IEC element 20 and the OEC elements 24, 26 may be controlled to maintain a relatively constant level of reflected light at a predetermined reference point, such as the driver's eye level.

Figure 7A:
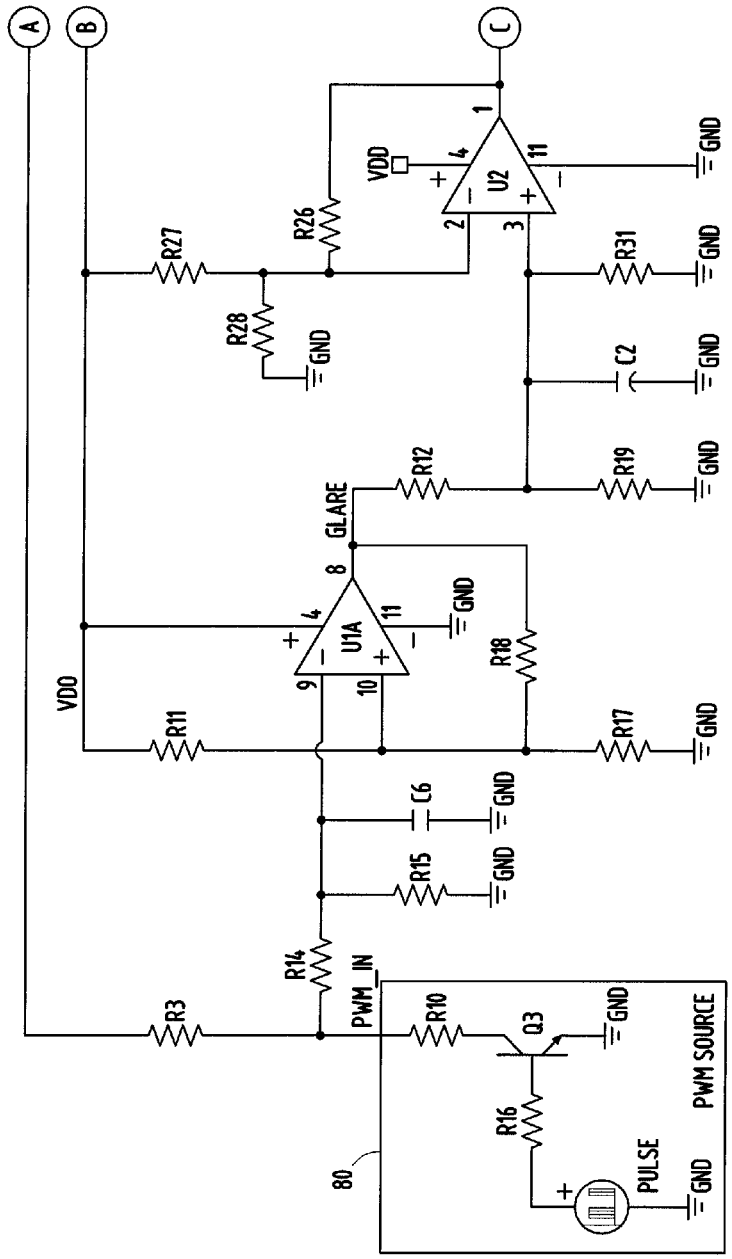
FIG. 7 is an exemplary schematic diagram of a drive circuit for an electrochromic element for use with the present invention.
Figure 7B:
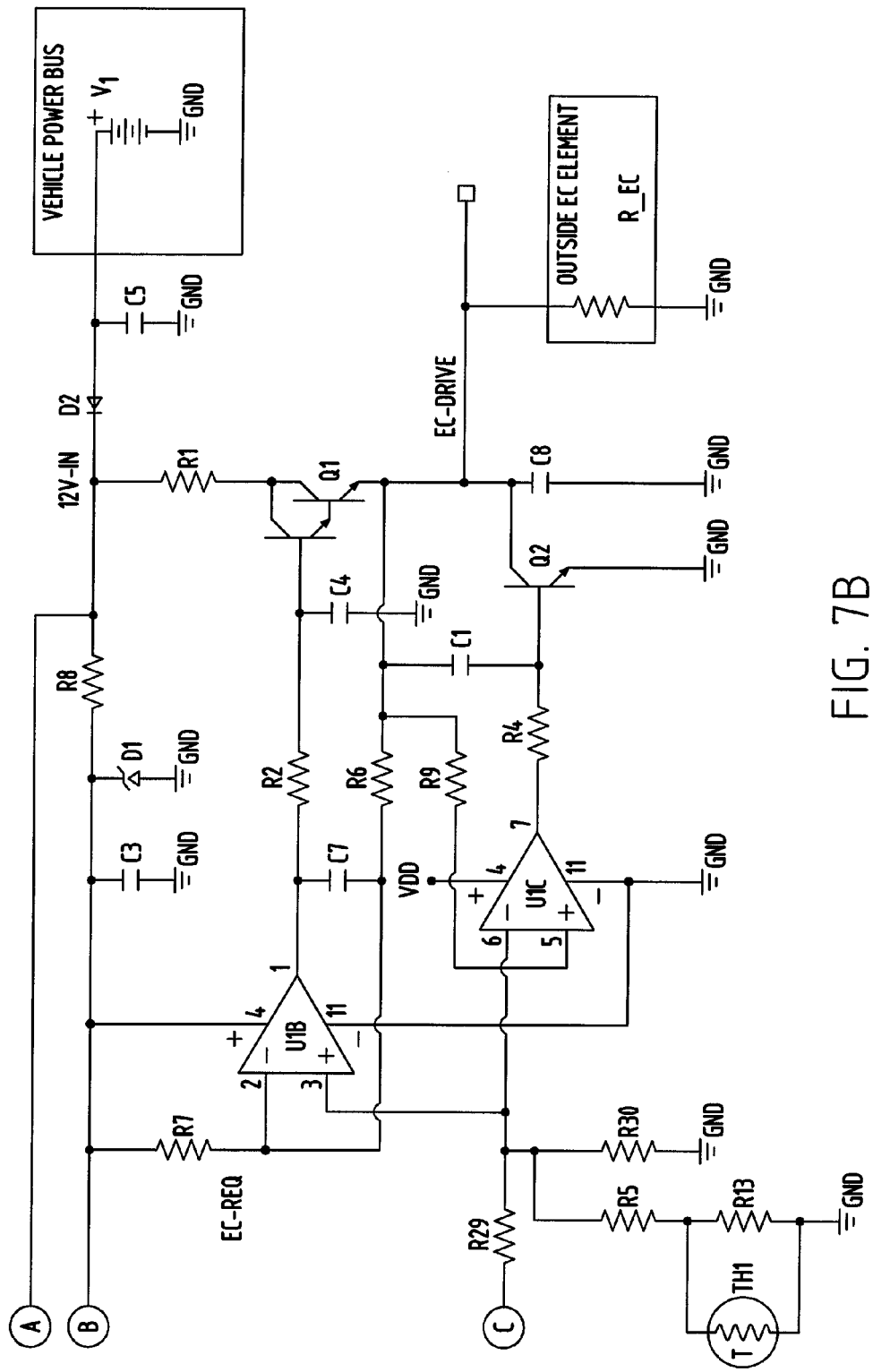
Figure 8:
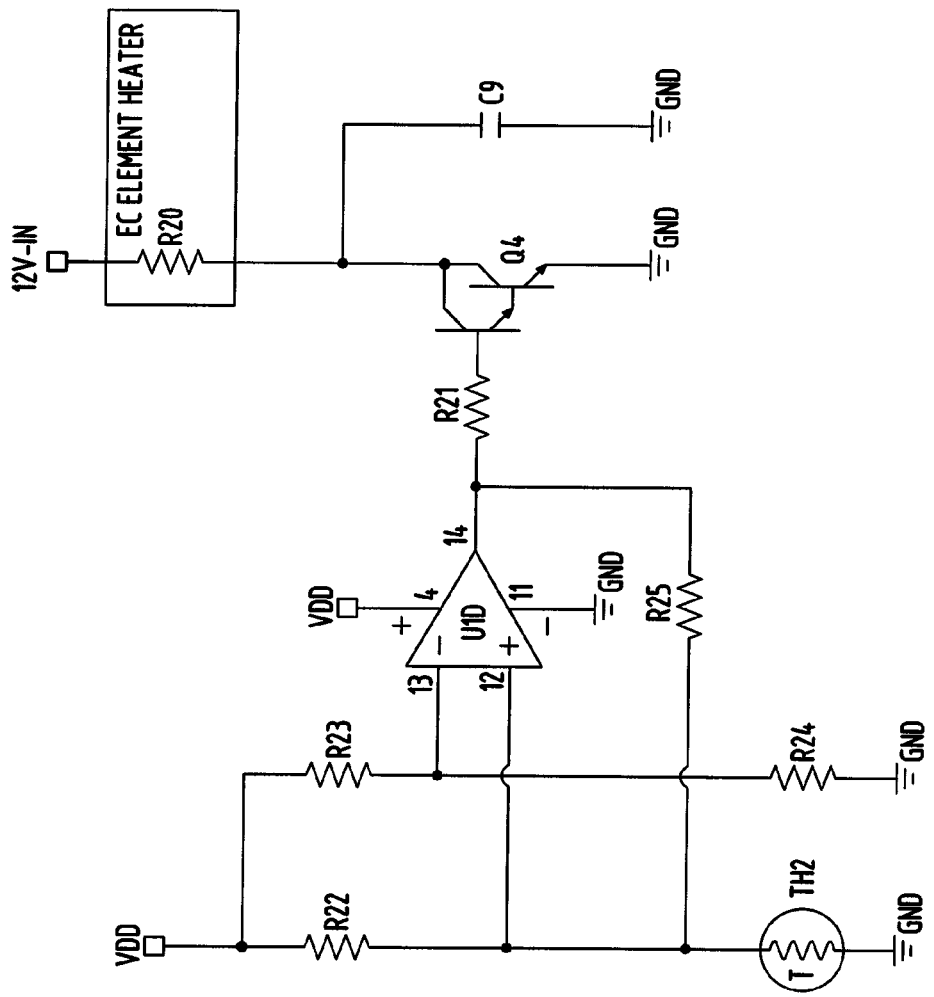
FIG. 8 is an exemplary schematic diagram of a drive circuit for an element heater for an electrochromic element in accordance with the present invention.

Various electronic drive circuits are suitable for use with the present invention. FIG. 7 is an exemplary schematic of a drive circuit for an electrochromic element while FIG. 8 represents an exemplary drive circuit for an optional element heater for an electrochromic element for use with the present invention. Other drive circuits for the electrochromic elements are considered to be within the broad principles of the invention.

Referring first to FIG. 7, the resistors R10, R16, and the transistor Q3 are used to simulate a pulse width modulated signal PWM_IN, which represents the glare level control signal. These components R10, R16, and Q3 do not form part of the electronic drive circuit for the electrochromic element in accordance with the present invention, generally identified with the reference numeral 80. As mentioned above, the electronic drive circuit 80 is powered by the nominal 12-volt vehicle battery 82. A resistor R8 along with the Zener diode D2 form a Zener regulated supply VDD as well as provide a reference for the difference amplifiers U1 and U2. A capacitor C5, connected between the positive terminal of the battery 82 and ground, provides electromagnetic interference (EMI) bypassing. A diode D2, connected with its anode to the positive terminal of the battery and its cathode connected to the 12-volt supply 12V_IN, provides reverse polarity protection. R3, R14, R15, C6, U1A, R11, R17, and R18 form a comparator circuit to eliminate ground and amplitude errors in the PWM glare signal from the inside mirror assembly. In some cases, where a bus receiver is located physically close to the OEC assembly, this section may not be required.

The PWM signal PWM_IN is applied to an inverting terminal of a difference amplifier U1A by way of resistor R14. The resistor R14, together with a resistor R15, connected between the inverting terminal of the difference amplifier U1A and ground, form a voltage divider to prevent the PWM_IN signal from exceeding the common mode range of the difference amplifier U1A. A resistor R3, coupled to the 12-volt supply 12V_IN, is used to pull up the PWM signal PWM_IN. A capacitor C6 is connected between the inverting terminal of the difference amplifier U1A and ground to provide a filtering and radio frequency (RF) immunity.

A reference voltage supply is applied to the non-inverting terminal of the difference amplifier U1A. In particular, a pair of resistors R11 and R17 are used to form a voltage divider to create a reference voltage U1A at the non-inverting input of the difference amplifier U1A. A feedback resistor R18, connected between the output and the non-inverting input of the difference amplifier U1A, provides hysteresis in order to improve the noise immunity of the difference amplifier U1A.

The output of the difference amplifier U1A is a glare control signal GLARE which has two states: nominally 0 and 3.4 volts, and is proportional to the glare level sensed and transmitted by the inside mirror assembly. A capacitor C2 is coupled between the non-inverting input of the difference amplifier U2 and ground to average the PWM signal to provide a DC glare signal EC-REQ, which is proportional to the duty cycle.

Figure 9:
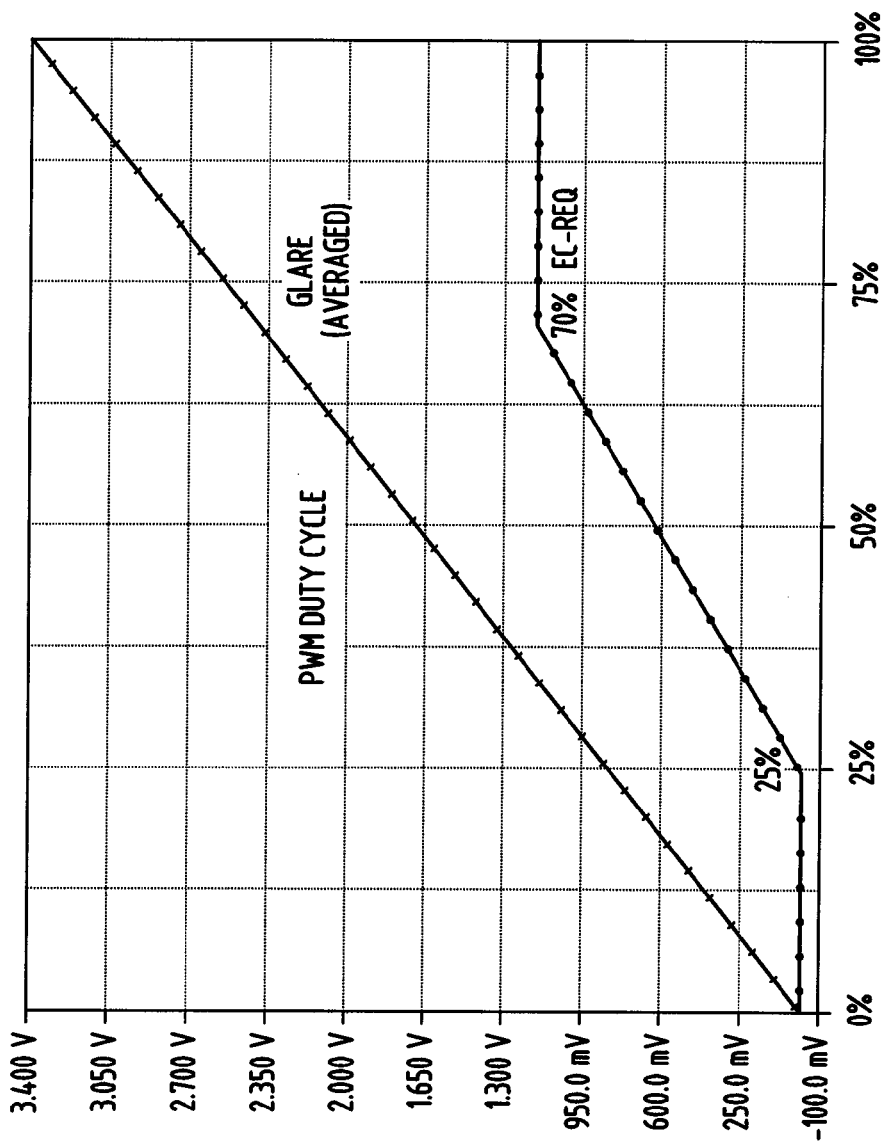
FIG. 9 is a graphical illustration of an exemplary slope and offset adjustment in accordance with the present invention illustrating the duty cycle in percent on the horizontal axis and the averaged glare signal GLARE and element voltage EC-REQ in volts on the vertical axis.

The glare signal GLARE is applied to a slope and an offset adjust circuit which includes a difference amplifier U2 and a plurality of resistors R12, R19, R26, R27, R28, and R31 and a filter circuit using C2. The gain or slope of the reflectance curve of the electrochromic element is set by the ratio of the resistors R26/R28, which is identical to the ratio of the resistors R19/R12. The slope may be selected as discussed above such that the reflected light at the driver's eye level is relatively the same for the inside and outside electrochromic mirrors. With the values shown in FIG. 7, the slope is such that the maximum element voltage is reached at about 70 percent duty cycle of the GLARE signal as illustrated in FIG. 9.

The resistors R27 and R31 are used to adjust the offset as discussed above. A negative offset may optionally be added by the resistors R27 and R31 to hold the electrochromic element voltage EC-DRIVE at about 0 volts until a minimum duty cycle is achieved. With the values shown in FIG. 7, the electrochromic element voltage will remain at about 0 volts until a duty cycle of 25 percent is reached as illustrated in FIG. 9.

The output of the difference amplifier U2 is scaled by a pair of resistors R29 and R30, which establish the maximum element voltage so that for a full scale output, the electrochromic element voltage is 1.2 volts, for example. Optional temperature compensation may be provided for the glare signal EC-REQ by way of a pair of resistors R5 and R13 and a thermistor TH1 in order to provide increased drive voltage at low temperatures to improve the response time.

A pair of difference amplifiers U1B and U1C are used to drive the drive transistors Q1 and Q2 to either drive or short the electrochromic element R_EC depending on the difference between the voltage EC_REQ, the DC glare signal, and the electrochromic element voltage EC-DRIVE. If the electrochromic element voltage EC-DRIVE exceeds the glare signal voltage EC_REQ, the difference amplifier U1C will go high, thereby turning on the drive transistor Q2, which shunts the electrochromic element R_EC, which, in turn, discharges the electrochromic element causing its reflectance to increase. The voltage at the output of the difference amplifier U1C will stabilize at that point required to cause the drive transistor Q2 to sink just enough current to match the EC-DRIVE and EC_REQ signals.

A resistor R4, connected to the output of the difference amplifier U1C, limits the base current to the drive transistor Q2. The combination of a capacitor C1 and a resistor R4 provide high frequency negative feedback to stabilize the U1C-Q2 feedback loop and to reduce EMI. A resistor R9, coupled between the non-inverting input of the difference amplifier U1C and the electrochromic element R_EC, provides electrostatic discharge (ESD) protection for the difference amplifiers U1B and U1C.

If the DC glare signal EC_REQ exceeds the drive signal EC-DRIVE by more than approximately 25 millivolts, for example, the output of the difference amplifier U1B will go high turning on the drive transistor Q1. The voltage at the output of the difference amplifier U1B will stabilize at the point required to cause the drive transistor Q1 to source just enough current to match the EC-DRIVE and EC-REQ+25 MV. The resistors R6 and R7 offset the voltage at the inverting input of the difference amplifier U1B by approximately 25 millivolts. Since the resistor R7 is much larger than resistor R6, it behaves more like a current source than as a voltage divider. This causes the largest percentage error when the electrochromic element voltage is near 0V. Since the electrochromic element is clear until its voltage reaches about 0.4 volt, this error is negligible once the element begins to darken. The current supplied by the resistor R7 flows through R6 and adds approximately 25 millivolts to EC-DRIVE signal to produce the signal EC-REQ+25 MV. This offset insures that the drive transistors Q1 and Q2 will not turn on at the same time. A pair of capacitors C7 and C4 control the loop gain of the U1B-Q1 Loop at high frequencies to ensure stability. The resistor R2 connected to the output of the difference amplifier U1B, limits the base current to the transistor Q1 and in conjunction with the capacitor C4, sets a high frequency pole. The combination of the resistor R6 and capacitor C7 sets another high frequency pole. The resistor R6 also provides ESD protection to the comparator U1B. A resistor R1 limits the collector current of the drive transistor Q1.

A capacitor C3 provides a power supply bypass to ensure the stability of the difference amplifier U1. A pair of capacitors C1 and C4, coupled to the drive transistors Q1 and Q2, provide EMI and ESD protection to the drive circuit 80. A resistor R1, disposed in series with the collector of the transistor Q1, reduces Q1's power dissipation.

An optional heater control circuit is illustrated in FIG. 8. A resistor R22 in series with a thermistor TH2 forms a voltage divider with a temperature dependent output. As the temperature drops, the voltage on the comparator U1D increases. A pair of resistors, R22 and R23, connected between the power supply VDD and the non-inverting and inverting inputs of the difference amplifier U1D, respectively, form a voltage divider with a fixed reference output at the inverting input of the difference amplifier U1D.

The output of the difference amplifier U1D will go high when the mirror temperature drops below, for example, 0.degree. C., turning on the transistor Q4 to activate a mirror element heater, represented as the element R20. A resistor R25 connected between the output and the non-inverting input of the difference amplifier U1D provides hysteresis. A resistor R21 connected between the base of the drive transistor Q4 and the output of the difference amplifier U1D limits the base current into the drive transistor Q4. A capacitor C9 provides for EMI protection for the circuit.

Figure 10:
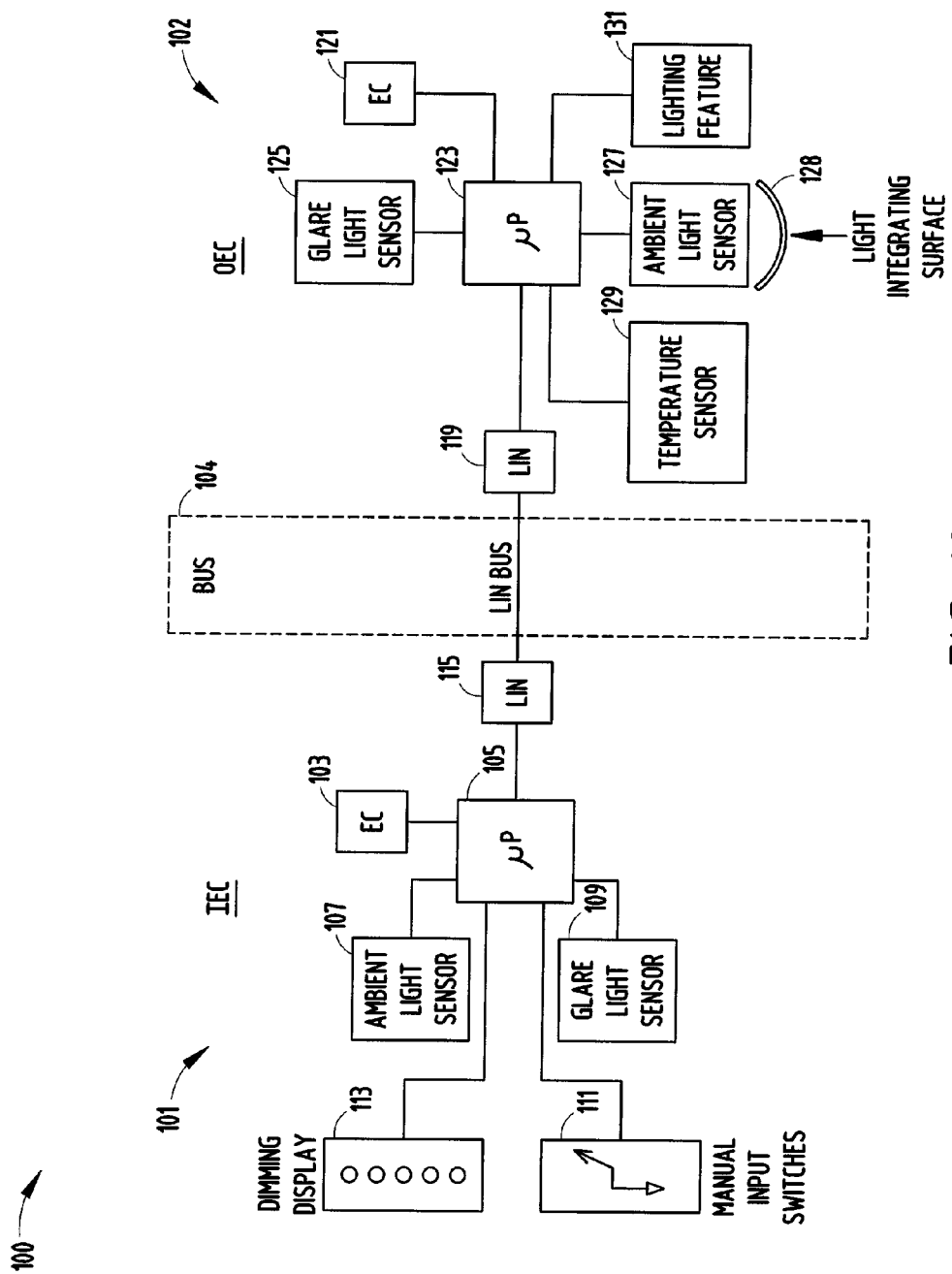
FIG. 10 is an exemplary block diagram illustrating an alternative mirror control system in accordance with the present invention.

Still yet another embodiment of the invention is illustrated in FIG. 10 which is an exemplary block diagram illustrating an alternative mirror control system 100. An IEC 101 connects to an OEC 102 using an electrical bus network 104. Although shown using a local interconnect network (LIN) bus, those skilled in the art will recognize that the electrical bus network 104 may utilize a controller area network (CAN) bus, InterUC (I2C) bus, FLEXRAY bus or one using an RS485 protocol. The IEC 101 includes an EC element 103 that works in connection with a microprocessor 105 to control the reflectance of the EC element 103. As noted herein, an ambient light sensor 107 and a glare light sensor 109 operate to provide data to the microprocessor 105 in order for the microprocessor to determine the correct reflectance or glare value to the driver or other user of the IEC 101.

Thus, the IEC 101 may use a simple ambient light sensing module or a complex system such as a camera based headlamp control system. A number of light sensing technologies may be used such as: cadmium sulfide (CdS) photocell sensor, ambient light sensor (ALS), Intersil ISL29001 (Light to I2C), Intersil EL7900 (Light to Current), photodiodes, phototransistors, photogates, Taos TSL230 (Light to Frequency) or CCDs. The sensor may be a single element, one dimensional (1D) or two dimensional (2D) array. The ambient light sensor 107 may include a spectral weighting filter—either on the die, in the packing material or as a secondary optical element.

In applications where a camera is used for headlamp control or lane departure the ambient light level may be computed as an average of a partial or full frame image. In a very simple system, the ambient light sensor 107 can be an electrical current output device connected by two wires of the OEC mirror 102. The OEC mirror 102 may simply measure the electrical current to determine ambient light level. In applications where more features are desired in the IEC 101, the microprocessor 105 may be used with a standard bus interface. The microprocessor 105 may operate with both the ambient light sensor 107 and the glare light sensor 109 and can measure the ambient light level and transmit the result to one or more OECs 102 over the bus link 104.

Additionally, a manual input switch 111 is also connect to the microprocessor 105 and works to allow the user to manual adjust the amount of reflectance at the EC element 103. An optional dimming display 113, such as an LCD or LED barograph, may also be connected to the microprocessor 105 and works to provide a visual display and/or audible annunciation to the user of the amount of reflectance or dimming of the EC element 103. Additional interior mirror features that are not shown include: compass, garage door opener, tire pressure detection, remote keyless entry, headlamp control, high-beam control, lane departure, global positioning system (GPS) devices, cellular telephone and GPS antennas, microphones or reverse camera displays. Manual operation of the OEC mirror 102 having no light sensor is also a possible configuration.

FIGS. 11A and 11B illustrate an outside electrochromic mirror where an ALS is positioned faces forward of the mirror and a glare sensor is positioned to receiver light to the rear of the mirror in accordance with an embodiment of the present invention. FIG. 11A is a rear perspective view of an OEC 120 where an ALS 129 is positioned at a lower portion of the housing rear face 123. An optical lens may also be used to cover an opening to the ALS 129 so the light is diffused into the ALS 129 no matter if the opening is partially obstructed due to insects, dirt or other road debris. A plurality of mounting arms 125, 127 are used to mount the OEC 120 to the vehicle and can be used to route control cable or other wire to sensors and other devices within the OEC 120. Similarly, FIG. 11B is a front prospective view of the OEC 120 which shows the EC element 131 used to reflect light to the driver or other occupant of the vehicle. As noted herein, a glare sensor 133 is mounted in the EC element 131 and works to detect light coming from the rear of the vehicle in order to properly determine the amount of light that will be reflected by the EC element 131. Similarly, FIG. 11C illustrates a front prospective view of an ALS assembly 128 that may be used in the OEC shown in FIGS. 11A and 11B and other embodiment as described herein. The ALS assembly 128 includes the ALS 129 that may be placed into a cavity or other inset area 132. A diffusing lens 135 is used to cover the ALS 129 so that light 136 entering the diffusing lens 135 such that diffused light is focused into a light beam 137. The diffusing lens 135 is typically manufactured from glass or high impact plastic and is snap fit or frictionally engaged within eh inset area 132. As noted herein, this allows the ALS 129 to continue to operate effectively no matter if the lens 137 is partially obstructed.

FIGS. 12A and 12B illustrate an outside electrochromic mirror where both the ALS and glare sensor face to the rear of the vehicle in accordance with another embodiment of the invention. FIG. 12A is a rear perspective view of an OEC 140 which shows no sensors or other detectors on the housing rear face 141. FIG. 12B is a front perspective view of the OEC 140 that illustrates both the ALS 143 and glare sensor 145 positioned at on upper and lower portions of EC element 147 such that light passes through the mirror glass before entering both ALS 143 or glare sensor 145.

Figure 14B:
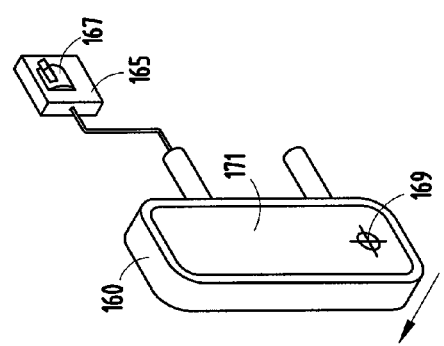
FIGS. 14A and 14B illustrate an outside electrochromic mirror where an ambient light sensor is remotely positioned and may be manually activated with a switch co-located with the ambient light sensor and a glare sensor is positioned to receive light to the rear of the mirror in accordance with an embodiment of the present invention.

FIGS. 13A and 14B illustrate an outside electrochromic mirror where an ALS is remotely positioned from the mirror and a glare sensor is positioned to receive light to the rear of the mirror in accordance with an embodiment of the present invention. FIG. 13A is a rear perspective view of an OEC 150 where an ALS 155 can be remotely mounted inside of the vehicle cab or other remote location. The cabling and/or control wiring for the ALS 155 can be mounted through either of the mounting arms 151, 153. FIG. 13B is a front perspective view of the OEC 150 illustrating the remote ALS 155 and a glare sensor 157 positioned to receive light from the rear of the vehicle though the EC element 159.

Figure 14A:
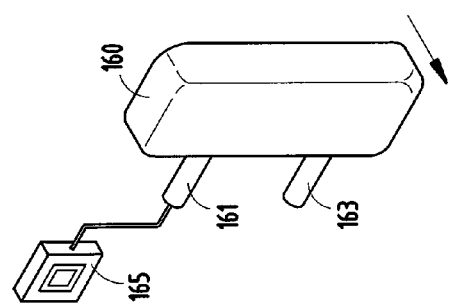

FIGS. 14A and 14B illustrates an outside electrochromic mirror where an ALS is remotely positioned and may be manually activated with a switch co-located with the ALS and a glare sensor is positioned to receive light to the rear of the mirror in accordance with an embodiment of the present invention. FIG. 14A is a rear perspective view of an OEC 160 where an ALS 165 can be remotely mounted inside of the vehicle cab or other remote location. Preferably the ALS 165 would be mounted in a located where ambient light entering the sensor would be free from obstructions such as dirt, insects or other road debris. The cabling and/or control wiring for the ALS 165 can be mounted through either of the mounting arms 161, 163. FIG. 14B is a front perspective view of the OEC 160 illustrating the remote ALS 165 and a glare sensor 169 positioned to receive light from the rear of the vehicle though the EC element 171. A manually operated switch 167 may be co-located with the ALS 165 that works to manually activate the ALS 165 by the driver or other operator. It is also possible that the switch 167 may be controlled by either the microprocessor 125 in the OEC or an internal microprocessor for the IEC as shown in FIG. 10.

Figure 15B:
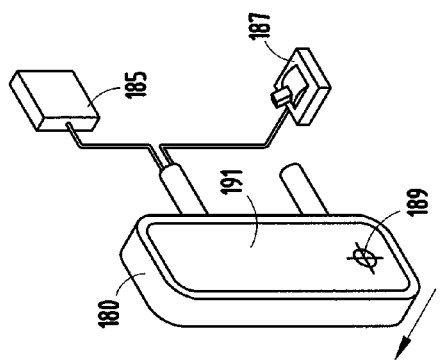
FIGS. 15A and 15B illustrate an outside electrochromic mirror where an ambient light sensor is remotely positioned and may be manually activated with a switch separated from the ALS and a glare sensor is positioned to receive light to the rear of the mirror in accordance with an embodiment of the present invention.
Figure 15A:
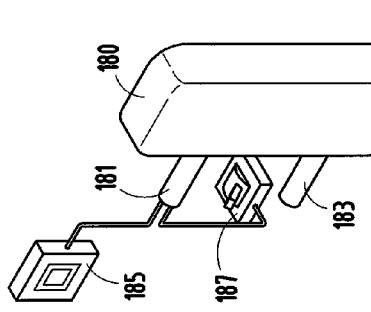

FIGS. 15A and 15B illustrate an outside electrochromic mirror where an ALS is remotely positioned and may be manually activated with a switch separated from the ALS and a glare sensor is positioned to receive light to the rear of the mirror in accordance with an embodiment of the present invention. FIG. 15A is a rear perspective view of an OEC 180 where an ALS 185 is remotely mounted inside of the vehicle cab or other remote location. Preferably the ALS 185 would be mounted in a located where ambient light entering the sensor would be free from obstructions such as dirt, insects or other road debris. The cabling and/or control wiring for the ALS 185 can be mounted through either of the mounting arms 181, 183. FIG. 15B is a front perspective view of the OEC 180 illustrating the remote ALS 185 and a glare sensor 189 positioned to receive light from the rear of the vehicle though the EC element 181. A manually operated switch 187 may be remotely mounted from the ALS 185 that works to manually activate the ALS 185 by the driver or other vehicle operator. It is also possible that the switch 187 may be controlled by either the microprocessor 125 in the OEC or an internal microprocessor for the IEC as shown in FIG. 10.

FIGS. 16A and 16B illustrate an outside electrochromic mirror where both the ALS and glare sensor face to the rear of the mirror and a remotely operated switch is used to activate the ALS in accordance with an alternative embodiment of the invention. FIG. 16A is a rear perspective view of an OEC 200 which shows no sensors or other detectors on the housing rear face 202. Mounting arms 201, 203 are used to mount the OEC 200 to a vehicle or other mounting structure. FIG. 16B is a front perspective view of the OEC 200 that illustrates both the ALS 207 and glare sensor 209 positioned at on upper and lower portions of EC element 211 such that light passes through the mirror glass before entering both ALS 207 or glare sensor 209. As seen in both FIGS. 16A and 16B, a manually operated switch 205 may be remotely mounted from the ALS 207 that works to manually activate the ALS 207 by the driver or other vehicle operator. It is also possible that the switch 205 may be controlled by either the microprocessor 125 in the OEC or an internal microprocessor for the IEC as shown in FIG. 10.

FIGS. 17A and 17B illustrate an outside electrochromic mirror where an ALS is positioned faces forward of the mirror and a glare sensor is positioned to receiver light to the rear of the mirror where both the ALS and glare sensor are not integrated with the mirror glass in accordance with an embodiment of the present invention. FIGS. 17A and 17B illustrate an outside electrochromic mirror where an ALS is positioned facing forward of the mirror and a glare sensor is positioned to receiver light to the rear of the mirror in accordance with an embodiment of the present invention. FIG. 17A is a rear perspective view of an OEC 210 where an ALS 211 is positioned at a lower portion of the housing rear face 213 and is not integrated with the EC element 215 but is mounted in the mirror housing 212. As noted in FIGS. 11A and 11B, an optical lens (not shown) may also be used to cover an opening to the ALS 211 so the light is diffused into the ALS 211 no matter if the opening is partially obstructed due to insects, dirt or other road debris. A plurality of mounting arms 217, 219 are used to mount the OEC 210 to the vehicle or other mounting assembly and can be used to route control cable or other wire (not shown) to sensors and other devices within the OEC 210. Similarly, FIG. 11B is a front prospective view of the OEC 210 which shows the EC element 215 used to reflect light to the driver or other occupant of the vehicle. In contrast to the embodiment shown in FIGS. 11A and 11B, the glare sensor 221 is not mounted in the EC element 215 but instead is mounted in a lower portion of the mirror housing 212. Like a glare sensor integrated with the EC element, the glare sensor 221 operates to detect light coming from the rear of the vehicle in order to properly determine the amount of light reflected by the EC element 215.

FIGS. 18A and 18B illustrate an outside electrochromic mirror where both the ALS and glare sensor face to the rear of the vehicle and are both not integrated within the mirror glass in accordance with an alternative embodiment of the invention. FIGS. 18A and 18B illustrate an outside electrochromic mirror where both the ALS and glare sensor face to the rear of the mirror in accordance with another embodiment of the invention. FIG. 18A is a rear perspective view of an OEC 230 which shows no sensors or other detectors on the housing rear face 231. FIG. 18B is a front perspective view of the OEC 230 that illustrates both the ALS 233 and glare sensor 235 positioned at on upper and lower portions of EC element 147 such that light passes through the mirror glass before entering both ALS 143 or glare sensor 145.

FIGS. 19A and 19B are illustrations showing configurations of a single and dual mirror system where the ambient sensor and glare sensor are both in the outside mirror. FIG. 19A illustrates a block diagram of a single mirror system 250 includes a OEC 251 that used adjacent to a vehicle cab 253. The OEC 251 includes both an ALS 254 and glare sensor 255 that are collocated with the operational electronics of these sensors in the OEC 251. FIG. 19B illustrates a block diagram of a dual mirror system 257 like that shown in FIG. 19A, where a first mirror 258 and second mirror 259 is used adjacent to the cab 261. As noted in the single mirror system 250, the OEC 258 includes a ALS 260 glare sensor 264 and control electronics (not shown) located in OEC 258 while the second mirror 259 has the ALS 262, glare sensor 263 and control electronics (not shown) located in the OEC 259.

FIGS. 20A and 20B are illustrations showing configurations of a single and dual mirror system where the ambient sensor is in the vehicle cab and the glare sensor and operational circuitry are located in the outside mirror. FIG. 20A illustrates a single mirror system 270 that includes an OEC 271 where the ALS 273 is located in the vehicle cab 275 and the glare sensor 277 and all control electronics in the OEC 271. Similarly, FIG. 20B is a dual mirror system 290 where a first OEC 291 includes a glare sensor 293 is located in the OEC 291. The second OEC 295 also includes a glare sensor 297 located with the OEC 291. An ALS 299 is located in the vehicle cab 299 and operates with both OEC 291 and OEC 295 with the respective control electronics also located in both OECs.

Finally, FIGS. 21A and 21B are illustrations showing configurations of a single and dual mirror system where the ambient sensor and operational circuitry located in the vehicle cab and the glare sensor is located in the outside mirror. FIG. 21A illustrates a single mirror system 300 where the OEC 301 includes a glare sensor 303 that is used with the OEC 301. An ALS 309 is used with the OEC 301 and is located in the vehicle cab 305 with control electronics 307. Similarly in FIG. 21B, the dual mirror system 311 includes a first OEC 313 and second OEC 315 located in vehicle cab 316. A glare sensor 317 is used with both OEC 313 and OEC 315 and an ALS 321 and control electronics 319 are located in the vehicle cab 317.

While the invention has been described with reference to details of the embodiments shown in the drawings, these details are not intended to limit the scope of the invention as described in the appended claims.

We claim:

1. A vehicle rearview mirror control system comprising:
   an interior rearview mirror element able to be varied in reflectance;
   an exterior rearview mirror element able to be varied in reflectance mounted in an exterior rearview mirror housing;
   an ambient light sensor (ALS) positioned to detect a light intensity from a direction forward of the interior rearview mirror element;
   a glare light sensor positioned to detect a light intensity from a direction rearward of the interior rearview minor element;
   a register for storing predetermined electronically encoded window tinting information;

a drive circuit coupled to the exterior rearview mirror element for generating a glare signal derived from the ALS and glare light sensor and selectively varying a drive signal to the exterior rearview mirror element as a function of the glare signal based upon the predetermined electronically encoded window tinting information; and wherein the reflectance of the interior rearview mirror element begins to decrease based on a first minimum light intensity detected by the glare light sensor and the reflectance of the exterior rearview mirror element begins to decrease based on a second minimum light intensity detected by the glare light sensor and the first minimum light intensity is different from the second minimum light intensity thereby allowing reflected light levels at a predetermined reference point to be approximately equal.

2. A vehicle rearview mirror control system as in claim 1, wherein said electronically encoded information is available to a plurality of exterior rearview mirror elements.

3. A vehicle rearview mirror control system as in claim 1, wherein the drive circuit is controlled by at least one microprocessor.

4. A vehicle rearview mirror control system as in claim 1, wherein the interior and exterior rearview mirror elements utilizes electrochromic (EC) glass.

5. A vehicle rearview mirror control system as in claim 1, wherein the ALS includes a light integrating surface for providing diffused light to the ALS.

6. A vehicle rearview mirror control system as in claim 1, further comprising at least one lighting feature for providing a vehicle turn annunciation.

7. A vehicle rearview mirror control system as in claim 1, further comprising at least one temperature sensor for providing air temperature.

8. A vehicle rearview mirror control system as in claim 1, wherein data from the mirror control system is communicated via an electronic bus.

9. A vehicle rearview minor control system as in claim 1, wherein the electronically encoded window tinting information is used with the interior rearview mirror element that for generating at least one mirror element drive signal as a function of the electronically encoded window tinting information.

10. A vehicle rearview mirror control system as in claim 1, wherein the first minimum light intensity is greater than the second minimum light intensity.

11. An exterior vehicular rearview mirror control system, comprising:

an interior electrochromic (EC) mirror element able to be varied in reflectance;

an exterior electrochromic (EC) mirror element able to be varied in reflectance;

at least one ambient light sensor (ALS) for measuring a light intensity at the back of the interior EC mirror element using a light integrating lens;

at least one glare sensor for measuring a light intensity at the interior EC mirror element and providing a glare signal;

a drive circuit for providing a drive signal for selectively varying the drive signal as a function of the glare signal based upon predetermined electronically encoded window tint information stored in a register and provided to the drive circuit for controlling the exterior EC mirror element based upon a glare level derived from the at least one ALS and at least one glare sensor; and wherein the reflectance of the interior EC mirror element begins to decrease based on a first minimum light intensity detected by the glare light sensor and the reflectance of the exterior EC mirror element begins to decrease based on a second minimum light intensity detected by the glare light sensor and the first minimum light intensity is different from the second minimum light intensity thereby allowing reflected light levels at a predetermined reference point to be approximately equal.

12. An exterior vehicular rearview minor control system as in claim 11, wherein the light integrating lens diffuses light to the at least one ALS.

13. An exterior vehicular rearview mirror control system as in claim 11, wherein the ALS is located in the interior EC mirror element.

14. An exterior vehicular rearview mirror control system as in claim 11, wherein the exterior EC minor element further comprises a lighting feature for indicating a vehicle turn.

15. An exterior vehicular rearview mirror control system as in claim 11, wherein the electronically encoded window tinting information is stored in a memory location.

16. An exterior vehicular rearview mirror control system as in claim 11, further comprising: a light for indicating a vehicle turn.

17. An exterior vehicular rearview mirror control system as in claim 11, wherein data from the at least one ALS and at least one glare sensor are communicated via an electrical bus to the interior electrochromic mirror element.

18. An exterior vehicular rearview minor control system as in claim 11, wherein the electronically encoded window tinting information is used with the interior rearview mirror element that for generating at least one mirror element drive signal as a function of the electronically encoded window tinting information.

19. An exterior vehicular rearview minor control system as in claim 11, wherein the first minimum light intensity is greater than the second minimum light intensity.

20. An outside rearview minor control system comprising:

a light for indicating a direction of turn;

an interior electrochromic (EC) mirror element able to be varied in reflectance;

an exterior electrochromic (EC) mirror element able to be varied in reflectance;

at least one ambient light sensor (ALS) for measuring a light intensity at the back of the interior EC mirror element using a light integrating surface lens;

at least one glare sensor for measuring a light intensity at a reflecting surface of the interior EC mirror element;

a register comprising predetermined electronically encoded window tinting information stored in a memory location;

a drive circuit for supplying a drive signal to the exterior EC mirror element in response to a glare level derived from the ALS, at least one glare sensor and the predetermined electronically encoded window tinting information received from the register over a vehicle communications bus; and wherein the reflectance of the interior EC mirror element begins to decrease based on a first minimum light intensity detected by the glare light sensor and the reflectance of the exterior EC mirror element begins to decrease based on a second minimum light intensity detected by the glare light sensor and the first minimum light intensity is different from the second minimum light intensity thereby allowing reflected light levels at a predetermined reference point to be approximately equal.

21. An outside rearview minor control system as in claim 20, wherein the ALS and glare sensor are mounted separately from the EC mirror element.

22. An outside rearview minor control system as in claim 20, wherein the ALS is located inside a vehicle cab.

23. An outside rearview minor control system as in claim 20, wherein the ALS and glare sensor are controlled by a microprocessor that controls the interior electrochromic mirror element.

24. An outside rearview minor control system as in claim 20, wherein data from the at least one ALS and at least one glare sensor are communicated via an electrical bus to the interior electrochromic mirror element.

25. An outside rearview minor control system as in claim 20, wherein the electronically encoded window tinting information is used with the interior rearview minor element that for generating at least one mirror element drive signal as a function of the electronically encoded window tinting information.

26. An outside rearview minor control system as in claim 20, wherein the first minimum light intensity is greater than the second minimum light intensity.

* * * * *